(12) United States Patent
He et al.

(10) Patent No.: US 7,672,847 B2
(45) Date of Patent: Mar. 2, 2010

(54) DISCRIMINATIVE TRAINING OF HIDDEN MARKOV MODELS FOR CONTINUOUS SPEECH RECOGNITION

(75) Inventors: Chuang He, Woburn, MA (US); Jianxiong Wu, Acton, MA (US); Vlad Sejnoha, Cambridge, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 12/241,811

(22) Filed: Sep. 30, 2008

(65) Prior Publication Data

US 2009/0055182 A1 Feb. 26, 2009

Related U.S. Application Data

(62) Division of application No. 10/719,682, filed on Nov. 21, 2003, now abandoned.

(60) Provisional application No. 60/428,194, filed on Nov. 21, 2002, provisional application No. 60/446,198, filed on Feb. 10, 2003.

(51) Int. Cl.
*G10L 15/14* (2006.01)

(52) U.S. Cl. ............... 704/256.2; 704/256.4; 704/256.6
(58) Field of Classification Search ................ 704/231, 704/232, 240, 256, 256.1, 256.2, 256.3, 256.4, 704/256.5, 256.6, 256.7, 256.8
See application file for complete search history.

(56) References Cited

U.S. PATENT DOCUMENTS 6,865,531 B1 * 3/2005 Huang ........................ 704/226

* cited by examiner

*Primary Examiner*—Huyen X. Vo
(74) *Attorney, Agent, or Firm*—Sunstein Kann Murphy & Timbers LLP

(57) ABSTRACT

Methods are given for improving discriminative training of hidden Markov models for continuous speech recognition. For a mixture component of a hidden Markov model state, a gradient adjustment is calculated of the standard deviation of the mixture component. If the calculated gradient adjustment is greater than a first threshold amount, an adjustment is performed of the standard deviation of the mixture component using the first threshold. If the calculated gradient adjustment is less than a second threshold amount, an adjustment is performed of the standard deviation of the mixture component using the second threshold. Otherwise, an adjustment is performed of the standard deviation of the mixture component using the calculated gradient adjustment.

1 Claim, 2 Drawing Sheets

DISCRIMINATIVE TRAINING OF HIDDEN MARKOV MODELS FOR CONTINUOUS SPEECH RECOGNITION

This is a divisional of U.S. patent application Ser. No. 10/719,682, filed Nov. 21, 2003, which claimed priority from provisional application 60/446,198, filed Feb. 10, 2003, and provisional application 60/428,194, filed Nov. 21, 2002, all of which are incorporated herein by reference.

FIELD OF THE INVENTION

The invention generally relates to automatic speech recognition, and more particularly, to techniques for adjusting the mixture components of hidden Markov models as used in automatic speech recognition.

BACKGROUND ART

Most speech recognition systems utilize a statistical model called the hidden Markov model (HMM). Such models consist of sequences of states connected by arcs, and a probability density function (pdf) associated with each state which describes the likelihood of observing any given feature vector at that state. A separate set of probabilities determines the transitions between the states. Most large vocabulary continuous recognition systems use continuous pdfs, which are parametric functions that describe the probability of any arbitrary input feature vector given a model state.

One drawback of using continuous pdfs is that the designer must make explicit assumptions about the nature of the pdfs being modeled—something which can be quite difficult since the true distribution form for the speech signal is not known. The most common class of functions used for this purpose is a mixture of Gaussians, where an arbitrary pdf is modeled by a weighted sum of normal distributions.

The model pdfs are most commonly trained using the maximum likelihood method. In this manner, the model parameters are adjusted so that the likelihood of observing the training data given the model is maximized. However, it is known that this approach does not necessarily lead to the best recognition performance. This problem can be addressed by discriminative training of the mixture models. The idea is to adjust the model parameters so as to minimize the number of recognition errors rather than fit the distributions to the data. One approach to discriminative training in a large vocabulary continuous speech recognition system is described in U.S. Pat. No. 6,490,555, the contents of which are incorporated herein by reference.

SUMMARY OF THE INVENTION

Embodiments of the present invention are directed to methods for improving discriminative training of hidden Markov models for a continuous speech recognition system. One embodiment assigns a value to a model parameter of a mixture component of a hidden Markov model state as a weighted sum of a maximum likelihood trained value of the parameter and a discriminatively trained value of the parameter. The interpolation weights are determined by the amount of data used in maximum likelihood training and discriminative training. Different mixture components may have different weights. The model parameter may be, for example, Gaussian mixture mean and standard deviation.

Another embodiment reuses the segmentation and recognition results of a first set of recognition models to discriminatively train a second set of recognition models. Specifically, a first set of recognition models is first used to perform segmentation and recognition of a set of speech training data so as to form a first model reference state sequence and a set of first model hypothesis state sequences. States in the first model reference state sequence are mapped to corresponding states in a second set of recognition models so as to form a second model reference state sequence. States in the set of first model hypothesis state sequences are mapped to corresponding states in the second set of recognition models so as to form a set of second model hypothesis state sequences. Selected model states in the second set of recognition models are then discriminatively trained using the mapped state sequences. In one specific such embodiment, the segmentation and recognition results of the detailed match models are mapped and then used to discriminatively train the fast match models.

In another embodiment, the gradients for the standard deviation of mixture components are clipped to a range. The range is determined by the mean and standard deviation of the gradients of the standard deviation of all the mixture components.

An embodiment of the present invention also avoids the tedious work of text normalization by determining the "correctness" of recognition hypotheses using the pronunciation of words in the reference and hypothesis texts.

DETAILED DESCRIPTION OF SPECIFIC EMBODIMENTS

Figure 1:
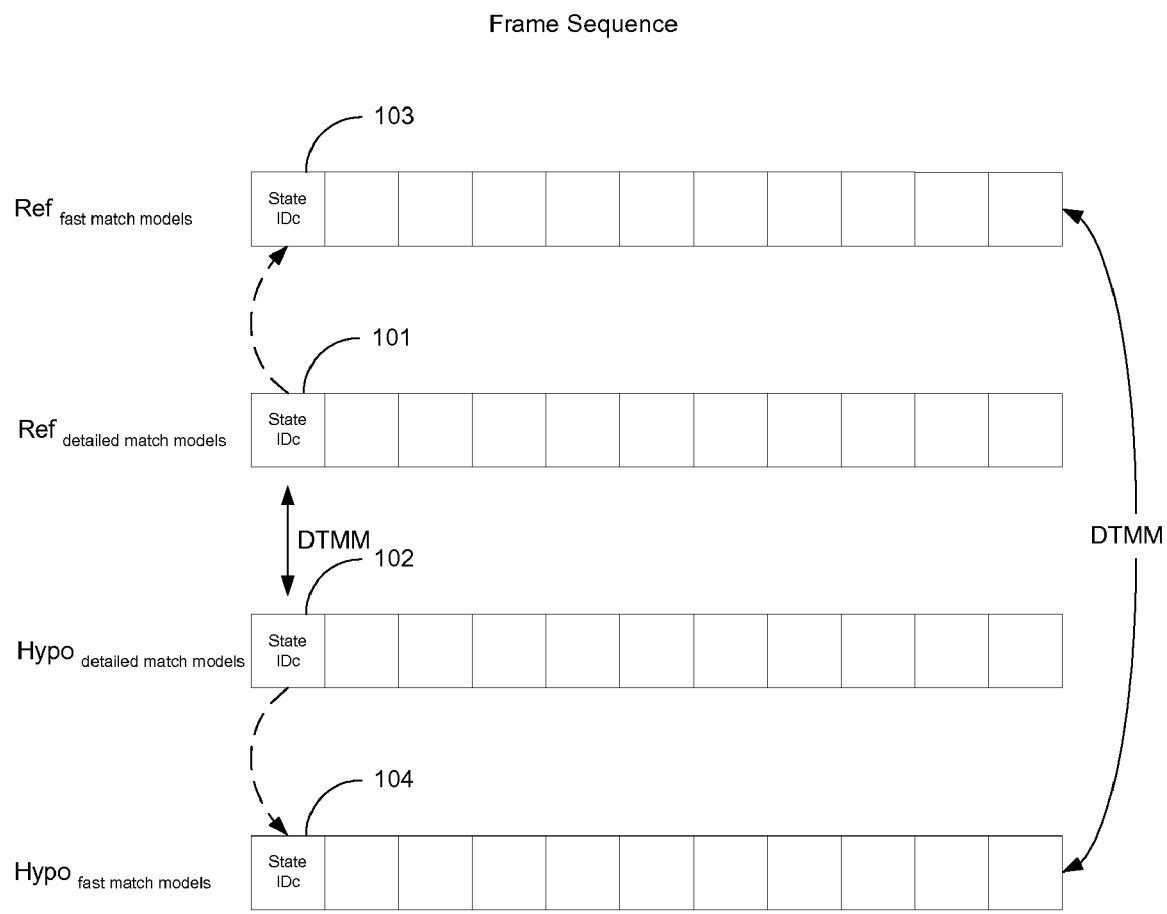
FIG. 1 shows how to reuse the segmentation and recognition results of the detailed match models to discriminatively train the fast match models.

It is well known that discriminative training algorithms are prone to over-training. These algorithms may significantly improve the recognition accuracy of the training data, but the improvement does not necessarily generalize to other independent test sets. In some cases, discriminatively trained models may even degrade the recognition performance on independent test sets. Embodiments of the present invention improve the generalization of discriminative training techniques by interpolating the discriminatively trained and the maximum likelihood trained models. Embodiments also limit the gradients of the standard deviation of mixture components.

Discriminative training algorithms are computationally intensive because segmentation and recognition of the entire training corpus may be required. Traditionally, in order to discriminatively train different models using the same training corpus (for example, models of difference sizes, or models used for detailed match and fast match), segmentation and recognition of the training data have to be performed for each of the different models, which is time consuming and inefficient. Embodiments of the present invention reuse the segmentation and recognition results of one particular model, for discriminative training of another model. For example, one specific embodiment reuses segmentation and recognition results of detailed match models for discriminative training of fast match models.

In the discriminative training algorithm used in one embodiment of the present invention, the hypothesized words in the recognition results of the training data are marked as "correct" or "incorrect" for discriminative training. Conventionally, this is done by matching the word label of a hypothesized word with the corresponding word in the reference text. To obtain accurate "correct" or "incorrect" labels, tedious manual or semi-manual text normalization typically has to be performed on the reference text. Embodiments of the present invention avoid text normalization by determining the "correctness" of recognition hypotheses using the pronunciation of the words in the reference and hypothesis texts.

Embodiments of the present invention are directed to various techniques for improving discriminative training of mixture models for continuous speech recognition. Such improvements can be considered as contributing to one or both of two system design objectives: (1) improving the recognition performance including recognition accuracy and/or speed, and (2) improving the efficiency of discriminative training process. Before describing these improvements in any detail, we start by reviewing some background art on one particular type of discriminative training technique called Minimum Classification Error (MCE) training.

In a continuous density pdf using Gaussian mixtures, the standard Gaussian mixture log-probability density function GMLP is described by:

$$GMLP(x(t), s) = -\log\left(\sum_{k}^{N(s)} a(s, k) G\left(x(t); \mu(s, k); \sum (s, k)\right)\right)$$

where $N(s)$ is the number of mixture components, $a(s,k)$ is the weight of mixture component $k$ of state $s$, and $G(x(t); \mu(s,k); \Sigma(s,k))$ represents the probability of observing $x(t)$ given a multivariate Gaussian with mean $\mu(s,k)$ and covariance $\Sigma(s, k)$.

However, experimental evidence indicates that a computationally simpler form of Gaussian mixture may be employed as the pdf. Using a simpler mixture model not only reduces computational load, but in addition, the resultant reduction in the number of free parameters in the model significantly improves trainability with limited quantities of data. Accordingly, the continuous density pdf used in the following described embodiments assumes that $\Sigma(s,k)$ is a diagonal matrix.

The average score for a path corresponding to an alignment of the input utterance with a reference model i is given by $$D_i = \frac{1}{P}\sum_{p=1}^{P} GMLP(x(p), q_{i,p}),$$

where $x(p)$ is the feature vector at time $p$, $q_{i,p}$ is the corresponding state index, and $P$ is the number of feature vectors in the input utterance.

The first step in the training of the continuous density pdfs is the initialization of the mean vectors $\mu(s,k)$ and the standard deviation vectors $\sigma(s,k)$, which are the square root of the diagonal elements of $\sigma(s,k)$. This can be done by training a conventional maximum likelihood Gaussian mixture pdf for each model state from the input utterance frames aligned with that state. The next step consists of discriminative training of the mean and standard deviation vectors. This is accomplished by defining an appropriate training objective function that reflects recognition error rate, and by optimizing the mean and standard deviation vectors so as to minimize this function.

One common technique applicable to the minimization of the objective function is gradient descent optimization. Gradient descent optimization is described, for example, in D. E. Rumelhart et al., *Parallel Distributed Processing*, Vol. 1, pp. 322-28, MIT Press, the contents of which are incorporated herein by reference. In this approach, the objective function is differentiated with respect to the model parameters to obtain the gradients, and the model parameters are then modified by the addition of the scaled gradients. A new gradient that reflects the modified parameters is then computed, and the parameters are adjusted further. The iteration is continued until convergence is attained, usually determined by monitoring the recognition performance on an evaluation data set which is independent of the training data.

A training database is preprocessed by obtaining for each training utterance a short list of candidate recognition models. In a continuous speech recognition system, such a list contains descriptions of model state sequences. U.S. Pat. No. 6,490,555 to Girija Yegnanarayanan et al., incorporated herein by reference, describes one particular approach to generating a set of candidate models. Each candidate list thus contains some number of correct models (subset C), and a number of incorrect models (subset I).

An error function $\epsilon_n$ for a particular training utterance n is computed from the pair-wise error functions $o_{i,j}$:

$$\varepsilon_n = \sum_{i \in C}\sum_{j \in I} O_{i,j}$$

where $o_{i,j}=(1+e^{-\beta(D_i-D_j)})^{-1}$, $\beta$ is a scalar multiplier, $D_i$ is the alignment score between the input token and a correct model $i \in C$, and $D_j$ is the alignment score between the input token and an incorrect model $j \in I$. The sizes of the sets C and I can be controlled to determine how many correct models and incorrect or potential intruder models are used in the training.

The error function of $o_{i,j}$ takes on values near 1 when the correct model score $D_i$ is much greater (i.e., worse) than the intruder score $D_j$, and near 0 when the converse is true. Values of $o_{i,j}$ greater than 0.5 represent recognition errors, while values less than 0.5 represent correct recognitions. The scalar multiplier parameter $\beta$ controls the influence of "near-errors" on the training. As previously described, the score $D_i$ between the utterance and model i is obtained by scoring the alignment path $$D_i = \frac{1}{P}\sum_{p=1}^{P} GMLP(x(p), q_{i,p}).$$

A similar expression can be written for $D_j$. For mixture component k of state s, differentiating the error function with respect to element l of the mean vector $\mu(s,k)$ yields the gradient:

$$-\frac{\partial \varepsilon_n}{\partial \mu(s, k, l)}.$$

Similarly, differentiating the error function with respect to element l of the standard deviation vector $\sigma(s,k)$ yields the gradient:

$$-\frac{\partial \varepsilon_n}{\partial \sigma(s, k, l)}.$$

For batch mode processing, in each iteration, the gradient is averaged over all utterances:

$$\Delta \mu(s, k, l) = \frac{1}{N} \sum_n \frac{-\partial \varepsilon_n}{\partial \mu(s, k, l)}$$

$$\Delta \sigma(s, k, l) = \frac{1}{N} \sum_n \frac{-\partial \varepsilon_n}{\partial \sigma(s, k, l)}$$

where N is the total number of utterances. The mean and standard deviation of mixture components are modified by the addition of the scaled gradient:

$$\hat{\mu}(s,k,l) = \mu(s,k,l) + w_\mu \Delta \mu(s,k,l)$$

$$\hat{\sigma}(s,k,l) = \sigma(s,k,l) + w_\sigma \Delta \sigma(s,k,l)$$

where $w_\mu$ and $w_\sigma$ are weights which determine the magnitude of the changes to the parameter set in one iteration. This process is repeated until some stopping criterion is met.

The gradient descent algorithm described above is an unconstrained optimization technique. For Gaussian mixture components, certain constraints must be maintained, e.g., $\sigma(s,k,l) > 0$. In Wu Chou, *Discriminant-Function-Based Minimum Recognition Error Rate Pattern-Recognition Approach To Speech Recognition*, IEEE Proceedings, Vol. 88, No. 8, August 2000, which is incorporated herein by reference, the author applied gradient descent algorithm to transformed mixture components. For example, the following transforms can be applied to the mean and standard deviation of mixture components:

$$\mu_{Transformed}(s, k, l) = \frac{\mu(s, k, l)}{\sigma(s, k, l)}$$

and $$\sigma_{Transformed}(s, k, l) = \log(\sigma(s, k, l))$$

Further details of specific approaches to implementing discriminative training in a continuous speech recognition system are given in U.S. Pat. No. 6,490,555 and in Wu Chou, *Discriminant-Function-Based Minimum Recognition Error Rate Pattern-Recognition Approach To Speech Recognition*, IEEE Proceedings, Vol. 88, No. 8, August 2000, which are incorporated herein by reference.

One embodiment of the present invention is directed to improving recognition performance by interpolating discriminatively trained mixture models with maximum likelihood trained mixture models. Generally, for some model parameter γ the final trained value of that parameter of a mixture component k in some state s, will be a weighted sum of the maximum likelihood trained value of the parameter and discriminatively trained value of the parameter:

$$\gamma_{Final}(s,k) = a_{s,k} \gamma_{ML}(s,k) + b_{s,k} \gamma_{DT}(s,k)$$

where $a_{s,k}$ and $b_{s,k}$ are weighting coefficients, the exact values of which depend on the amount of training data and may be different for different mixture components.

In one specific such embodiment, the model parameters that are interpolated are the Gaussian mixture mean vector and standard deviation vector. For each model state s and mixture component k, an iterative process is used to determine the final trained value of the mean and standard deviation vector. First, maximum likelihood training is used to initialize the mean and standard deviation vector: $\mu_{ML}(s,k)$ and $\sigma_{ML}(s,k)$. Then an iterative loop is entered in which discriminative training is applied to determine $\mu_{DT,i}(s,k)$ and $\sigma_{DT,i}(s,k)$ for iteration i, and the discriminatively trained parameters are interpolated with the smoothed parameters from the previous iteration i−1 to determine smoothed model parameters for iteration i:

$$\mu_{Smooth,i}(s,k) = a_{s,k,i} \mu_{Smooth,i-1}(s,k) + b_{s,k,i} \mu_{DT,i}(s,k), i=1, \ldots M,$$

$$\sigma_{Smooth,i}(s,k) = a_{s,k,i} \sigma_{Smooth,i-1}(s,k) + b_{s,k,i} \sigma_{DT,i}(s,k), i=1, \ldots M$$

where $$\mu_{Smooth,0}(s, k) = \mu_{ML}(s, k),$$
$$\sigma_{Smooth,0}(s, k) = \sigma_{ML}(s, k),$$
$$a_{s,k,i} = \frac{FrameCount_{ML}(s, k)}{FrameCount_{ML}(s, k) + FrameCount_{DT,i}(s, k)},$$

and $$b_{s,k,i} = 1 - a_{s,k,i}.$$

$FrameCount_{ML}(s,k)$ is the frame count for mixture component k of state s in maximum likelihood training, $FrameCount_{DT,i}(s,k)$ is the corresponding frame count in iteration i of discriminative training. This iterative training loop continues until some stopping criterion is met and a final trained value of the mean $\mu_{Final}(s,k)$ and standard deviation $\sigma_{Final}(s,k)$ is established.

Another embodiment reuses segmentation and recognition results from a first set of recognition models for discriminative training of a second set of recognition models. For each training utterance, the segmentation and recognition results include:

A reference state sequence obtained by performing forced alignment of the training utterance with the reference text, and A set of N hypothesis state sequences corresponding to the top N hypothesized word sequences, or a lattice representing the recognition results.

In one embodiment, the top N hypothesis state sequences are used. In other embodiments, the lattice can be used. Each arc of the lattice contains the identification of the word associated with the arc, the timing information, and a list of state sequences. The top N hypothesis state sequences or the lattice can be obtained by performing recognition of the training utterance.

States in the reference state sequence of the first model are mapped to corresponding states in a second set of recognition models so as to form a reference state sequence of the second model. States in a set of N hypothesis state sequences of the first model are mapped to corresponding states in the second set of recognition models so as to form a set of N hypothesis state sequences of the second model. Selected model states in the second set of recognition models are then discriminatively trained using the mapped results.

The mapping of the state sequences is performed in the following way:

1) States in the state sequences corresponding to the first set of models are first mapped to phonemes based on the decision tree of the first set of models.

2) Phoneme sequences obtained from Step 1) are then mapped to state sequences corresponding to the second set of models based on the decision tree of the second set of models.

In one specific such embodiment, the segmentation and recognition results of detailed match models are mapped and then used to discriminatively train fast match models. Fast match acoustic models are commonly used to quickly prone the recognition search space. One extended discussion of this subject is provided by P. S. Gopalakrishnan and L. R. Bahl, *Fast Match Techniques*, pp. 413-428 in "Automatic Speech and Speaker Recognition: Advanced Topics," Chin-Hui Lee et al., 1996, the contents of which are incorporated herein by reference. In many speech recognition systems, separate models are used for performing fast match.

Segmentation and recognition results for the detailed match models are collected by running segmentation and recognition on the training data. The segmentation and recognition results of the detailed match models are mapped to results of the fast match models using the two-step method described in the previous page. Then, the fast match models are discriminatively trained using the mapped segmentation and recognition results.

FIG. 1 shows this concept. Initially, segmentation and recognition are performed on the training data using the detailed match models. For a given input utterance, this results in a detailed match model reference state sequence 101 and a set of detailed match model hypothesis state sequences. For illustration purposes, only one hypothesis state sequence (denoted by 102) is showed in FIG. 1. Based on the segmentation and recognition results of the detailed match models (as in 101 and 102), discriminative training may be performed on the mixture models of the detailed match states. Then, rather than regenerating fast match model reference and hypothesis state sequences from another iteration of segmentation and recognition, an embodiment of the present invention maps:

(1) the identities of the detailed match model reference states in 101 to corresponding fast match model reference states in 103, and (2) the identities of the detailed match model hypothesis states in 102 to corresponding fast match model hypothesis states in 104.

Then, discriminative training may be performed on the fast match models using the mapped states (as in 103 and 104).

As explained above, this approach avoids the computationally intensive process of regenerating segmentation and recognition results for different models. In one specific embodiment, the discriminative training time of the fast match models was reduced from ten days to one day. In addition, experimental results showed that performing discriminative training of the fast match models produced significant improvement in recognition speed (10-15%) with no decrease in recognition accuracy.

Another embodiment of the present invention improves the generalization of MCE-based discriminative training techniques by limiting or clipping the gradients of the standard deviation of mixture components based on the statistics of these adjustments. The gradient refers to modification of each of the model standard deviations:

$$\Delta\sigma(s, k, l) = \frac{1}{N}\sum_n \frac{-\partial \varepsilon_n}{\partial \sigma(s, k, l)}.$$

Figure 2:
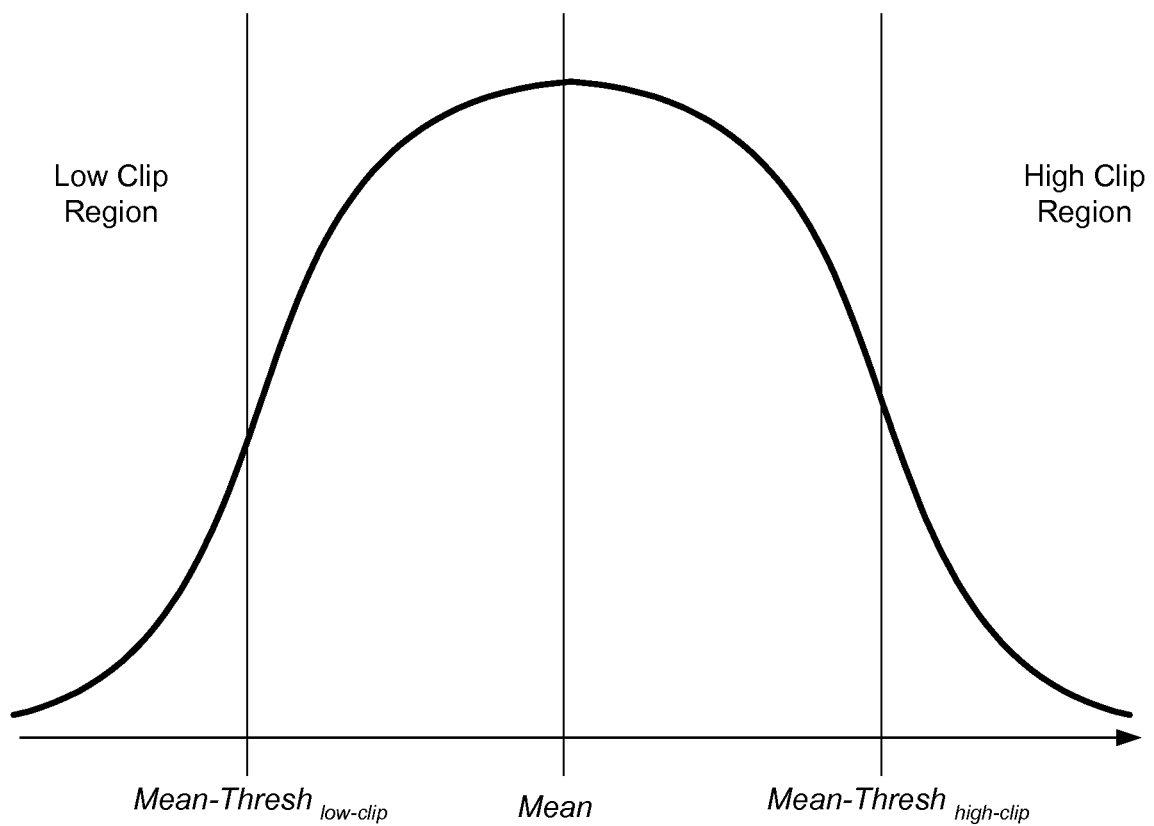
FIG. 2 shows clipping of the gradients of the standard deviation of mixture components according to one embodiment of the present invention.

By limiting or clipping the gradient, we mean that if a calculated gradient for the standard deviation is greater or less than some threshold distance from the average of the gradients, then some corresponding maximum or minimum gradient is used, instead of the actual calculated gradient. FIG. 2 shows this idea where a gradient distribution (of all mixture components) curve is centered at some mean value. Any gradient for the standard deviation greater than some high-clip threshold or less than some low-clip threshold will be set to the corresponding high-clip or low-clip threshold instead of the actual calculated gradient, i.e., $$\Delta\sigma(s, k, l)_{clipped} = \begin{cases} \Delta\sigma(s, k, l)_{calculated}, \\ \quad \text{where} \\ \text{Mean}\{\Delta\sigma\} - Thresh_{low-clip} < \Delta\sigma(s, k, l)_{calculated} < \\ \quad \text{Mean}\{\Delta\sigma\} + Thresh_{high-clip} \\ \text{Mean}\{\Delta\sigma\} + Thresh_{high-clip}, \\ \quad \text{where} \\ \Delta\sigma(s, k, l)_{calculated} > \text{Mean}\{\Delta\sigma\} + Thresh_{high-clip} \\ \text{Mean}\{\Delta\sigma\} - Thresh_{low-clip}, \\ \quad \text{where} \\ \Delta\sigma(s, k, l)_{calculated} < \text{Mean}\{\Delta\sigma\} - Thresh_{low-clip} \end{cases}$$

where Mean$\{\Delta\sigma\}$ is the mean of $\Delta\sigma(s,k,l)$ for all the s, k, l, and typically $Thresh_{high-clip} = Thresh_{low-clip} = \alpha \times Std\{\Delta\sigma\}$ where $Std\{\Delta\sigma\}$ is the standard deviation of $\Delta\sigma(s,k,l)$ for all the s, k, l, and $\alpha$ is a constant. Typically, $\alpha$ is in the range of [2, 3].

An embodiment of the present invention also avoids the tedious work of text normalization by determining the "correctness" of recognition hypotheses using the pronunciation of words in the reference and hypothesis texts. Traditionally, word label is used to mark the "correctness". However, in acoustic model training data, the same word in the reference text may appear in different form(s) in the recognition vocabulary. For example, the word "newborn" may appear as "newborn" in the reference text while appears as "new-born" in the recognition vocabulary. If the word label is used to determine if a hypothesized word is correct or not, then a word recognized as "new-born" will be determined as "incorrect" if the corresponding word in the reference text is "newborn", which is not a correct decision.

To make the form of words in the reference text and the recognition vocabulary match, typically tedious manual or semi-manual text normalization is needed. This problem becomes more severe when training texts are collected from different sources and transcribed using different philosophies. By using the pronunciation of words to determine if a hypothesized word is "correct" or not, the text normalization procedure is completed avoided.

Specifically, a hypothesized word is marked as "correct" if its pronunciation is the same as the pronunciation of the corresponding word in the reference text and is marked as "incorrect" if its pronunciation is not the same as the pronunciation of the corresponding word in the reference text. Only the "incorrect" words are used for discriminative training.

The correspondence between the hypothesized word and the reference word is determined based on the amount of time overlap of the two words.

Another advantage of using the pronunciation of words to determine the "correctness" of hypothesized words is that it makes discriminative training more focused on correcting errors caused by the acoustic model. If word label is used to mark the "correctness", then a hypothesized word (e.g. "to") that has the same pronunciation as the corresponding word (e.g. "two") in the reference text, but has different word label, will be marked as incorrect. However, from acoustic point of view, these words are recognized "correctly". They are errors caused by the language model. If these words are used in discriminative training, they will bias the data statistics used to compute the gradients; therefore make it less effective in correcting errors caused truly by the acoustic model. Using the pronunciation of words to mark the "correctness" eliminates this bias.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of a continuous speech recognition system for discriminatively training hidden Markov models, the method comprising:

for a mixture component of a hidden Markov model state, calculating in a speech recognition system a gradient adjustment of the standard deviation of the mixture component, and i. if the calculated gradient adjustment is greater than a first threshold amount, performing an adjustment of the standard deviation of the mixture component using the first threshold, or ii. if the calculated gradient adjustment is less than a second threshold amount, performing an adjustment of the standard deviation of the mixture component using the second threshold, else iii. performing an adjustment of the standard deviation of the mixture component using the calculated gradient adjustment to produce an adjusted hidden Markov model for speech recognition.

* * * * *